United States Patent
Wang

(10) Patent No.: US 6,794,054 B2
(45) Date of Patent: Sep. 21, 2004

(54) BENDABLE BOARD MATERIAL

(76) Inventor: Wen-Tsan Wang, PO Box 82-144, Taipei (TW)

( * ) Notice: Subject to any disclaimer, the term of this patent is extended or adjusted under 35 U.S.C. 154(b) by 28 days.

(21) Appl. No.: 10/224,398

(22) Filed: Aug. 21, 2002

(65) Prior Publication Data

US 2004/0038064 A1 Feb. 26, 2004

(51) Int. Cl.$^7$ .............................................. B32B 21/06
(52) U.S. Cl. .................... 428/535; 428/537.1; 220/4.33
(58) Field of Search .............................. 428/535, 537.1; 220/4.33

(56) References Cited

U.S. PATENT DOCUMENTS 4,039,109 A * 8/1977 Rhodes ........................ 226/172
6,419,103 B1 * 7/2002 Wang ......................... 220/4.33

* cited by examiner

Primary Examiner—Leszek Kiliman
(74) Attorney, Agent, or Firm—Leong C. Lei

(57) ABSTRACT

A bendable board material having a flexible base sheet, and two sets of hard slats respectively symmetrically fastened to two opposite sides of the flexible base sheet and arranged in parallel.

1 Claim, 6 Drawing Sheets

BENDABLE BOARD MATERIAL

BACKGROUND OF THE INVENTION

1. Field of the Invention

The present invention relates to board materials and, more particularly to a bendable board material that can be bent into any of a variety of shapes for making any of a variety of containers.

2. Description of the Related Art

Conventional baskets may be made of different materials including ceramics, glass, wood, plastics, stainless steel, etc. In addition to the function of holding things, attractive baskets can also be used as ornaments. A basket made of wood shows a graceful ancient style that greatly attracts consumers' attention. Baskets made of ceramics, glass, wood, plastics, stainless steel, or other metallic materials show a rigid style. Cloths may be used for making baskets. However, when a piece of cloth is selected for making a basket, hard support means must used to support the cloth in shape.

U.S. patent application Ser. No. 09/835,545 now U.S. Pat. No. 6,419,103 teaches the use of weaving wooden strips into panels for making containers. A container made according to this method is complicated and expensive.

SUMMARY OF THE INVENTION

The present invention has been accomplished under the circumstances in view. It is main object of the present invention to provide a bendable board material that can be bent into any of a variety of shapes for making any of a variety of products such as baskets, containers, and ornamental partitions. To achieve this and other objects of the present invention, the bendable board material comprises a flexible base sheet, and two sets of hard slats respectively symmetrically bonded to two opposite sides of the flexible base sheet and arranged in parallel. The hard slats of the same set are arranged in parallel and spaced from one another at a pitch so that the finished board material can be bent along the gap between each two adjacent hard slots.

DETAILED DESCRIPTION OF THE PREFERRED EMBODIMENT

Figure 1:
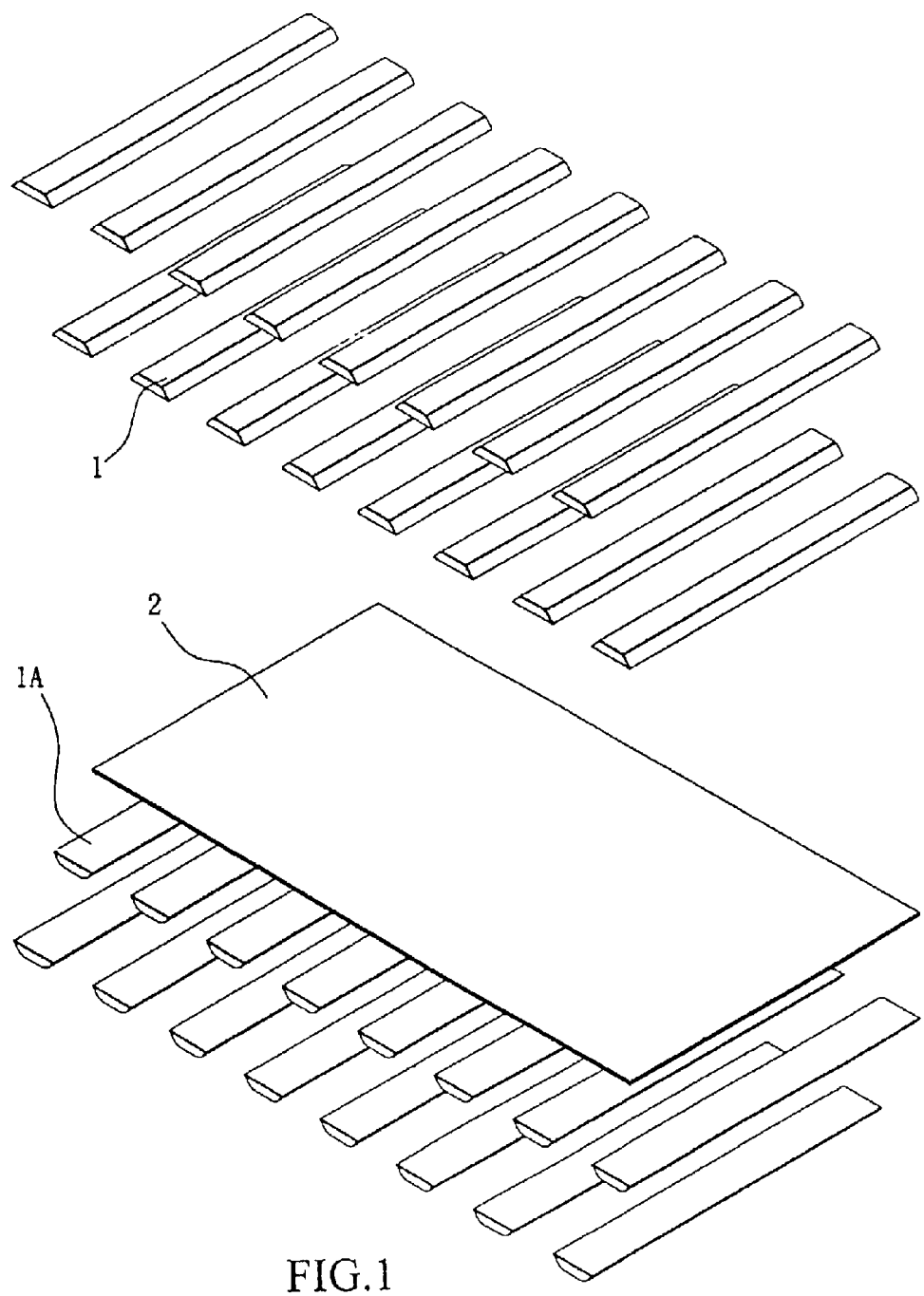
FIG. 1 is an exploded view of a bendable board material according to the present invention.
Figure 2:
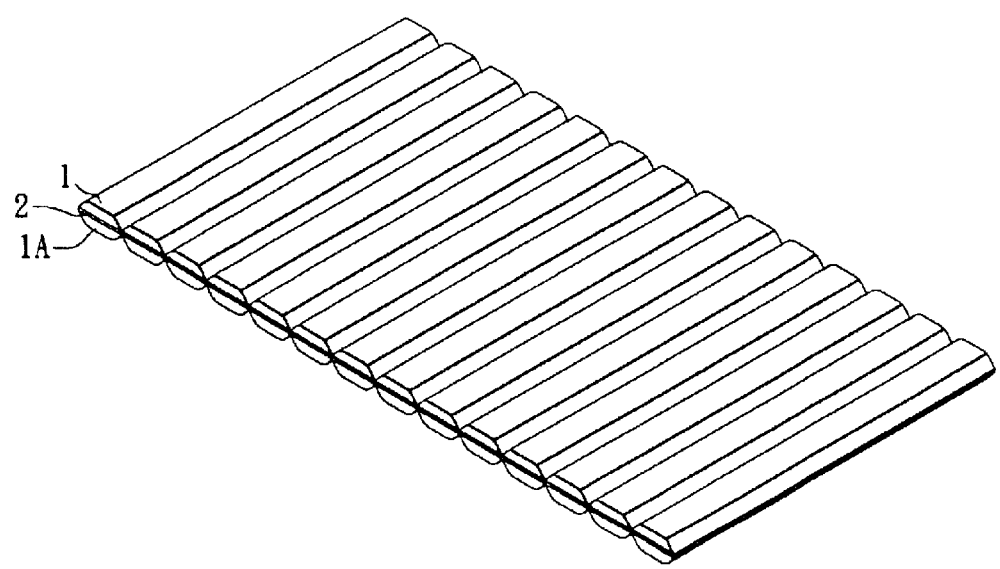
FIG. 2 is an assembly view of the bendable board material according to the present invention.
Figure 3:
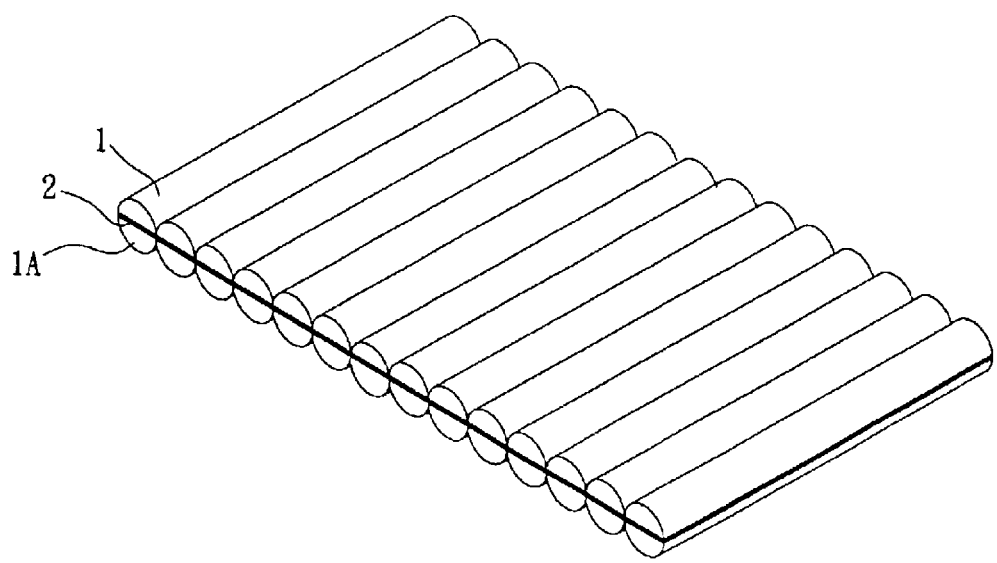
FIG. 3 is an elevational view of an alternate form of the bendable board material according to the present invention.

Referring to FIGS. 1 and 2, a bendable board material is shown comprised of a flexible base sheet 2, and hard slats 1 and 1A symmetrically fastened to the two opposite sides of the base sheet 2 and arranged in parallel. The base sheet 2 can be made of cloth or resilient material. The hard slats 1 and 1A are long, thin, narrow pieces of wood or metal. Preferably, the hard slats 1 and 1A are made of wood. The hard slats 1 and 1A can be made having any of a variety of cross sections. For example, the hard slats shown in FIGS. 1 and 2 have a trapezoidal cross section; the hard slats shown in FIG. 3 has a semi-circular cross section.

The hard slats 1 and 1A each have a bottom surface coated with a layer of bonding agent, and then bonded to the top or bottom surface of the base sheet 2 by means of the application of a heat press. When assembled, the hard slats 1 at the top surface of the base sheet 2 match the hard slats 1A at the bottom surface of the base sheet 2.

Figure 4:
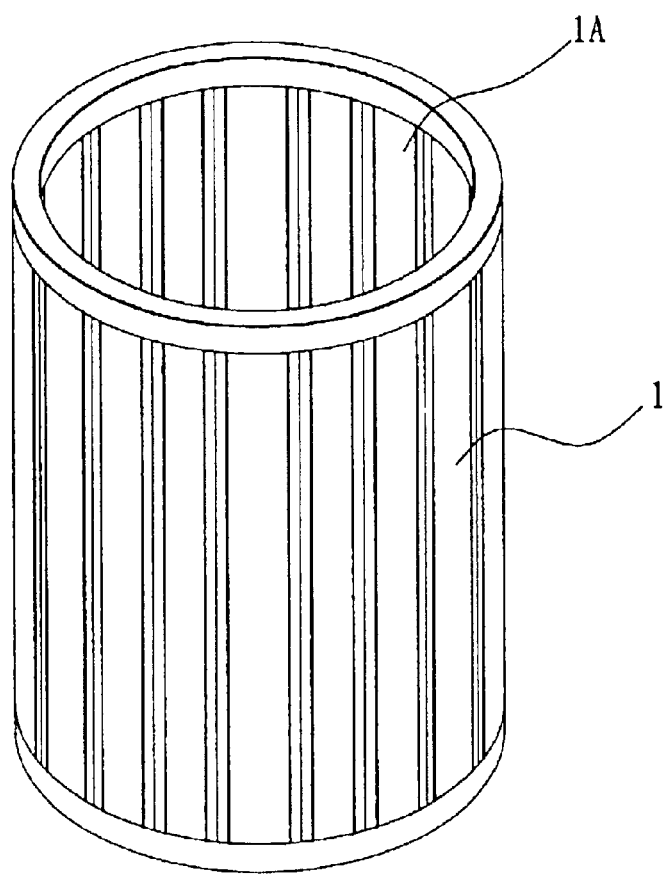
FIG. 4 shows one application example of the present invention.

Referring to FIG. 4, because the hard slats 1 at the top surface of the base sheet 2 match the hard slats 1A at the bottom surface of the base sheet 2 respectively and because the hard slats 1 or 1A at one side of the base sheet 2 are arranged in parallel and spaced from one another at an equal pitch, the board material can rolled into a roll and then mounted with a bottom plate and a top hoop, forming a cylindrical basket.

Figure 5:
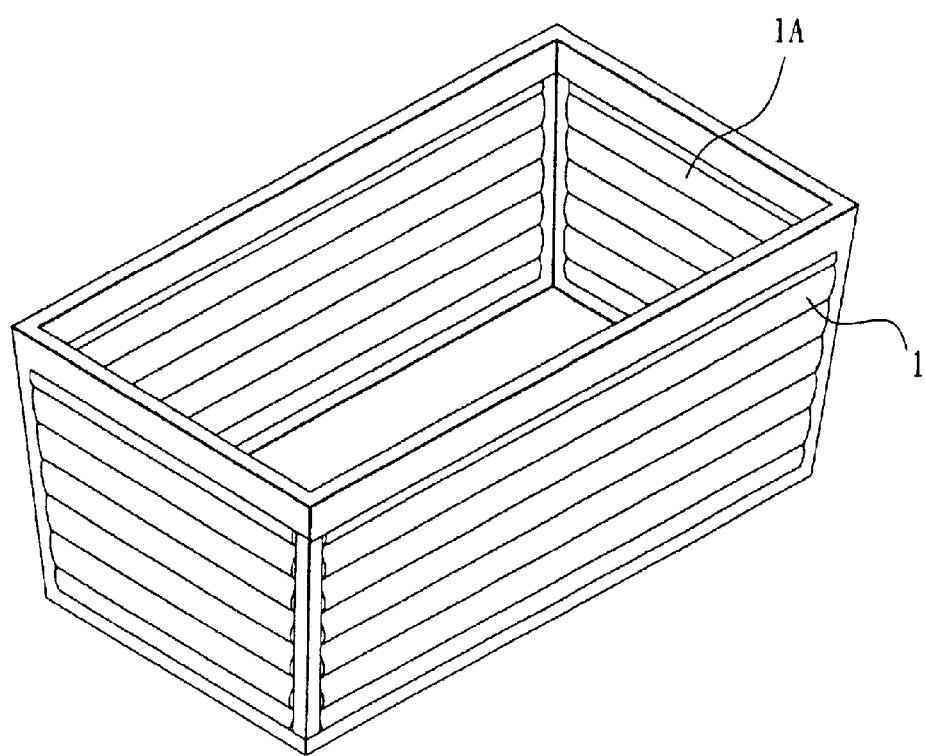
FIG. 5 shows another application example of the present invention.

Referring to FIG. 5, the board material can be cut into desired shapes and sizes for making a rectangular basket.

Figure 6:
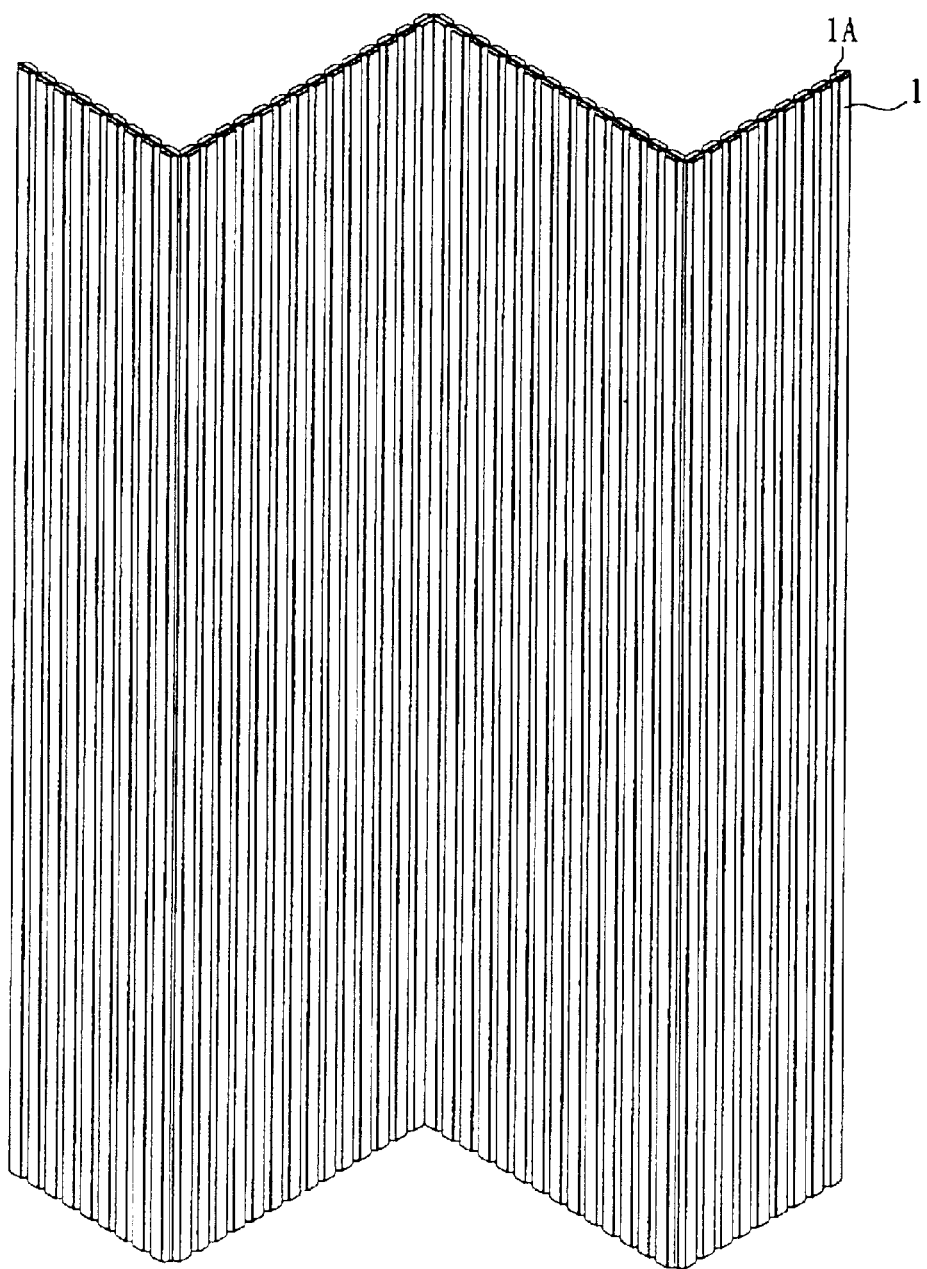
FIG. 6 shows still another application example of the present invention.

Referring to FIG. 6, the board material can be bent into a wave-like shape serving as an ornamental partition.

A prototype of bendable board material has been constructed With the features of the annexed drawings of FIGS. 1 through 6. The bendable board material functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A bendable board material comprising:

a flexible base sheet;

two sets of bard slats symmetrically fastened to two opposite sides of said base sheet and arranged in parallel;

wherein said base sheet is made of cloth, said hard slats being long, thin, narrow pieces of wood, said hard slats having a bottom surface coated with a layer of bonding agent and then bonded to a top or bottom surface of said base sheet by means of heat press.

* * * * *